May 19, 1942.  L. CABALLERO MEJIAS  2,283,876
NUT CRACKING MACHINE
Filed May 24, 1941   3 Sheets-Sheet 1

Inventor
Luis Caballero Mejias

By Shepherd Campbell
Attorneys

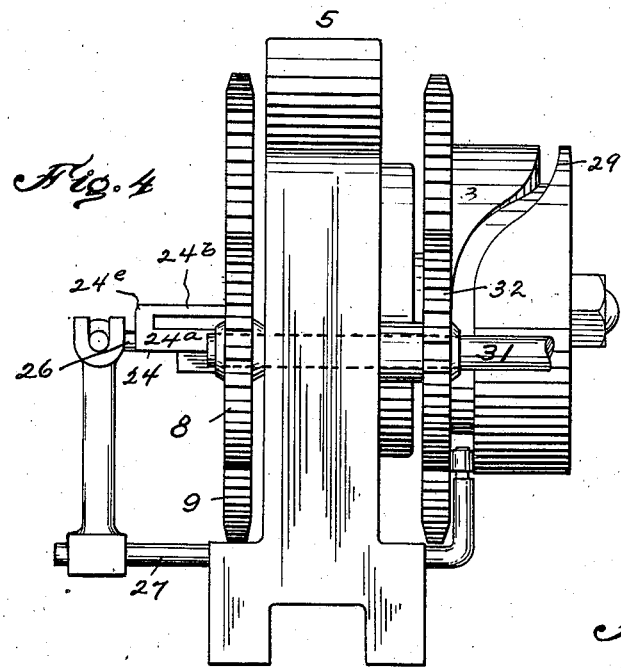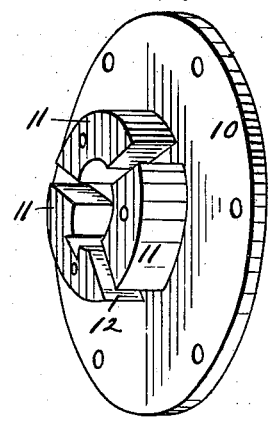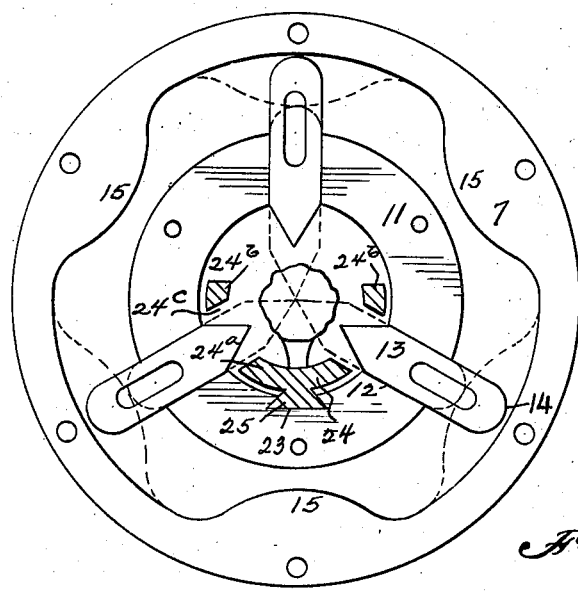

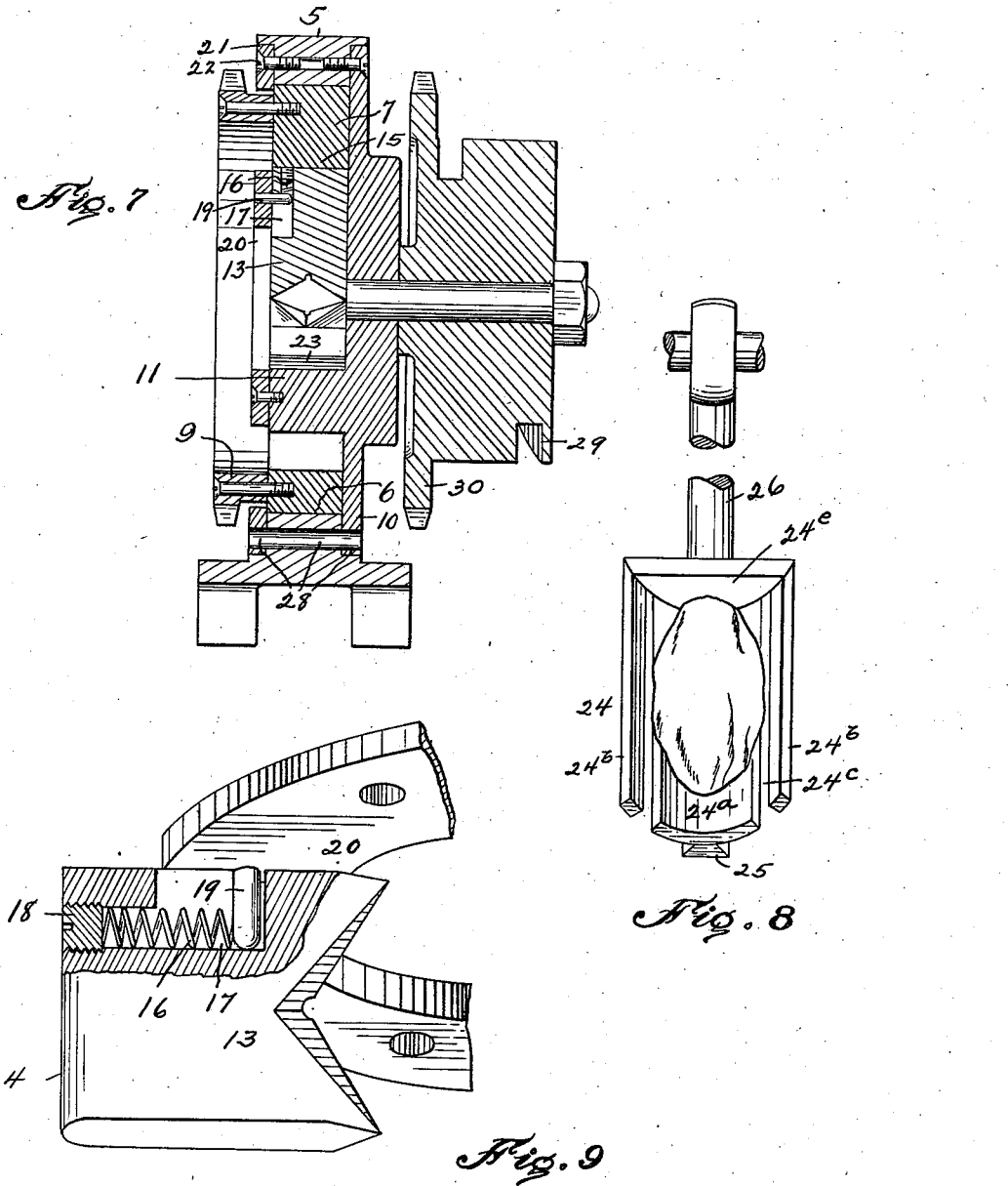

Patented May 19, 1942

2,283,876

UNITED STATES PATENT OFFICE 2,283,876

NUT CRACKING MACHINE

Luis Caballero Mejias, Caracas, Venezuela

Application May 24, 1941, Serial No. 395,084

3 Claims. (Cl. 146—12)

This invention relates to machines for cracking nuts, and it has for its object to provide an improved device of this character which will crack the nuts rapidly and efficiently and in such manner as not to multilate the nut meats.

While the machine is adapted for cracking more than one kind of nut, it is particularly intended and adapted for cracking the babusu nut. This nut has a relatively soft shell and hard center. The hard center yields a pure white oil having a large vitamin A content that adapts it for use in place of cod liver oil. The shell itself is also of utility in that it contains a high percentage of acetone.

Further objects and advantages of the invention will be set forth in the detailed description which follows:

In the accompanying drawings:

Fig. 4 is a right side elevation of the machine;

Fig. 5 is a front elevation of the cam and guide abutments, hereinafter described;

Fig. 6 is a perspective view of the abutment-carrying face plate;

Fig. 7 is a central vertical sectional view with the nut feed carriage removed;

Fig. 8 is a plan view of the nut feed carriage, and,

Fig. 9 is a view partly in section and partly in perspective of one of the teeth and the associated pin-carrying disc.

Like numerals designate corresponding parts throughout the several figures of the drawings.

Figure 1:
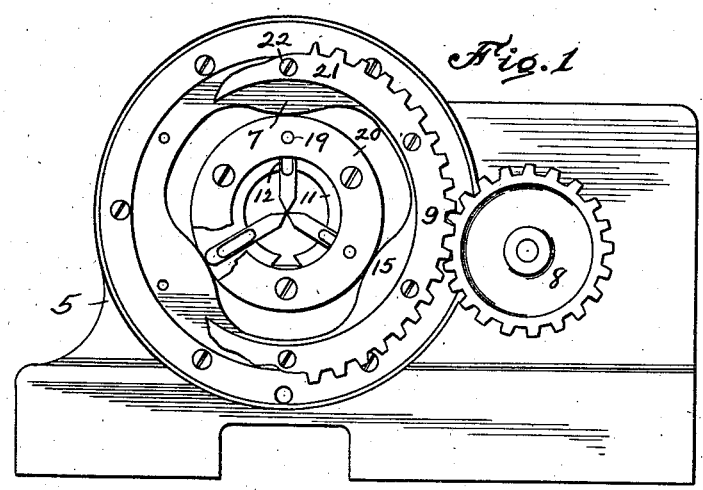
Figure 1 is a front elevation of the machine of my invention, with the nut feed carriage removed.
Figure 2:
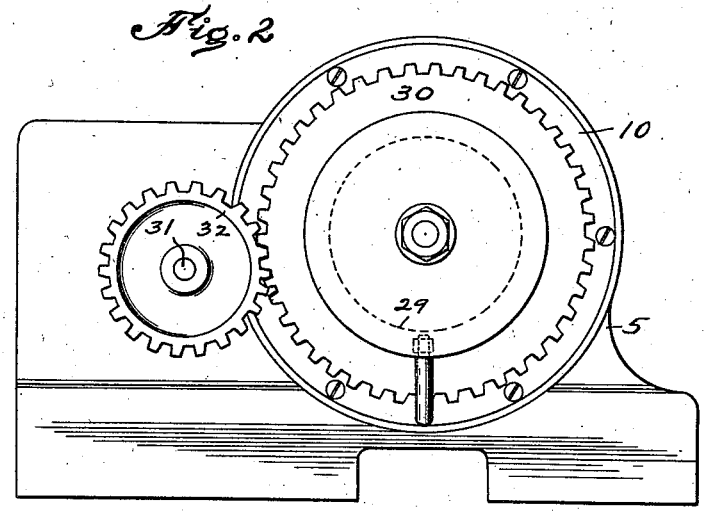
Fig. 2 is a rear elevation thereof.

The main frame of the machine comprises a casting 5 having a central circular opening 6 formed therein, in which a cam or eccentric 7 is mounted to turn under the influence of power imparted thereto by a main driving pinion 8 and gear 9. One side of the casing constituted by the frame 5 is closed by a face plate 10. The inner face of this face plate carries three abutments 11, the centers of which are spaced 120° apart and the ends of which lie in such spaced relation to each other as to leave three radially disposed guide channels 12, in which the cracking teeth are slidably disposed. The outer ends of the teeth 13 are rounded as indicated at 14 for engagement by the inner periphery of the cam 7.

It will be observed that the inner periphery of this member 7 is shaped to provide three inwardly protruding cams 15, and when these cam surfaces ride over the outer ends of the teeth, the teeth are thrust toward each other to simultaneously engage the sides of the nut N and crack the same.

Figure 3:
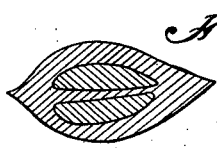
Fig. 3 is a sectional view through one of the babusu nuts, hereinafter described.

A longitudinal, sectional view of a babusu nut is illustrated in Fig. 3 and since the outer shell is relatively soft, while the center is relatively hard, and since the teeth have their engaged ends shaped to concave formation as shown, the shells are ruptured in such fashion that they may be readily disengaged from the kernel of the nut, while the removal of the outer shell renders it possible to easily dislodge the kernel from about the central core.

The teeth are moved by the cams, as described, toward a common center under the action of the portions 15 and they are retracted when such portions 15 move out of engagement with them, by springs 16. These springs are mounted in recesses 17 formed in the teeth and bear between retaining plugs 18 of the teeth and pins 19 of a disc or washer 20. This disc is secured by countersunk screws to the abutments 11. A retaining ring or washer 21 is secured by suitable screws 22 to the frame 5 and overlaps the cam 7 enough to prevent the cam from moving out of the frame 5.

A dove-tailed guide-way 23 is formed in the lowermost abutment 11 and serves as a mounting for a slidable carriage 24, said carriage being provided upon its bottom with a rib 25 that is shaped to engage in the guide-way 23. The carriage 24 comprises a curved bottom 24$^a$ and a pair of side bars 24$^b$, said side bars being spaced from the bottom far enough to leave openings 24$^c$ through which the two lowermost teeth may pass as they move inwardly. The side bars are connected to a rear wall 24$^e$ of the carriage and said carriage comprises no front wall. Therefore, the presence of the teeth does not interfere with the endwise movement of the carriage.

The carriage is mounted upon a rod 26 to which reciprocatory movement is imparted from a rod 27. Rod 27 is slidably mounted in aligned openings 28 formed in the parts 5, 10 and 21 and has reciprocatory endwise movement imparted to it by a cam 29 carried by gear wheel 30 the latter being driven from shaft 31 through pinion 32.

The operation of the device has, in the main, already been made clear. However, it may be stated, in addition, that the carriage 24 in its inward movement, carries the nut illustrated, into a position in alignment with the three teeth 13 to be cracked as described, when said teeth are brought together. As the gears continue to turn, the actuating mechanism of the carriage withdraws said carriage to a position outside of the machine so that the cracked nut may be removed and another placed in the carriage preparatory to the repetition of the operation.

It is to be understood that the invention is not limited to the precise construction set forth, but that it includes within its purview whatever changes fairly come within either the terms or the spirit of the appended claims.

Having described my invention, what I claim is:

1. A machine of the character described comprising a ring-like frame, an annular cam fitted to turn therein, a face plate secured to one side thereof and having three abutments spaced 120 degrees apart, said abutments projecting into the interior of the cam and being spaced from each other at their ends far enough to leave tooth receiving slideways, three teeth mounted in said slideways having their outer ends rounded for engagement by the cam and having their inner ends of concave formation to thereby conform roughly to the shape of a nut, a washer-like element secured to the abutments and provided with three pins, the teeth being provided with recesses into which said pins project, retracting springs in said recesses bearing against said pins, a gear wheel secured to the cam, a rod mounted to slide transversely of the frame and face plate at the bottom of the frame, a cam driven with said gear wheel and acting upon said rod to impart reciprocation thereto, a feed carriage mounted to move in and out of position between the teeth to thereby present nuts to the action of said teeth and means for imparting movement to said carriage from said rod.

2. A machine of the character described comprising a ring-like frame having its axis substantially horizontally disposed, an annular cam mounted to turn therein, a plurality of radially disposed and radially movable teeth mounted within and acted upon by said cam to be simultaneously moved toward each other and toward said horizontal axis, a horizontally traveling carriage movable along said horizontal axis, said carriage having an open top for the entry of nuts thereinto and having slotted side walls for the passage of at least two of said teeth thereinto during the travel of said carriage and means for imparting movement to the carriage in synchronism with the movement of said teeth.

3. A machine of the character described comprising a ring-like frame and a supporting base for holding said frame upright and with its axis substantially horizontal, an annular cam mounted to turn in said ring-like frame, a wall closing one side of said frame, a plurality of radially movable nut crunching teeth, guide means upon said wall for said teeth, a horizontally traveling feed carriage disposed axially of the cam having an open top for the reception of nuts, and having openings in its side walls for the passage of some of said teeth, an annular driving ring, engaging with the cam, through which the carriage moves, actuating and guiding means for the carriage slidably mounted in the frame and a common driving means for said actuating means and the annular cam, through which the teeth and the carriage are caused to move in synchronism.

L. CABALLERO MEJIAS.